(12) United States Patent
Lowe et al.

(10) Patent No.: US 11,714,161 B2
(45) Date of Patent: Aug. 1, 2023

(54) DISTANCE-BASED POSITIONING SYSTEM AND METHOD USING HIGH-SPEED AND LOW-SPEED WIRELESS SIGNALS

(71) Applicant: ZEROKEY INC., Calgary (CA)

(72) Inventors: Matthew William Lowe, Calgary (CA); Vahid Dehghanian, Calgary (CA)

(73) Assignee: ZEROKEY INC., Calgary (CA)

(*) Notice: Subject to any disclaimer, the term of this patent is extended or adjusted under 35 U.S.C. 154(b) by 0 days.

(21) Appl. No.: 17/222,298

(22) Filed: Apr. 5, 2021

(65) Prior Publication Data

US 2021/0223355 A1 Jul. 22, 2021

Related U.S. Application Data

(63) Continuation of application No. 16/820,445, filed on Mar. 16, 2020, now Pat. No. 10,969,462, which is a
(Continued)

(51) Int. Cl.
*G01S 5/14* (2006.01)
*H04W 4/02* (2018.01)
(Continued)

(52) U.S. Cl.
CPC .............. *G01S 5/14* (2013.01); *G01S 5/02* (2013.01); *G01S 5/021* (2013.01); *G01S 5/0242* (2013.01);
(Continued)

(58) Field of Classification Search
CPC .......... G01S 5/021; G01S 5/14; G01S 5/0242; G01S 11/16; G01S 5/00; G01S 5/30;
(Continued)

(56) References Cited

U.S. PATENT DOCUMENTS

| 10,627,479 B2* | 4/2020 | Lowe et al. | G01S 5/14 |
|---|---|---|---|
| 10,969,462 B2* | 4/2021 | Lowe et al. | G01S 5/14 |

(Continued)

FOREIGN PATENT DOCUMENTS

| CN | 102362193 A | * | 2/2012 | .......... G01S 5/0252 |
|---|---|---|---|---|
| CN | 104981850 A | * | 10/2015 | .......... H04L 67/131 |

OTHER PUBLICATIONS

Detecting the Location of a Phone Using RF Wireless and Ultrasonic Signals; TW 201708840 A (Year: 2017).*
(Continued)

*Primary Examiner* — Meless N Zewdu
(74) *Attorney, Agent, or Firm* — Gowling WLG (Canada) LLP

(57) ABSTRACT

A positioning system has an initiator device configured for emitting a high-speed wireless signal, at least one reference device configured for receiving the high-speed wireless signal and emitting a low-speed wireless signal after receiving the high-speed wireless signal, at least one target device each having one or more components for receiving the low-speed wireless signals, and at least one engine configured for determining the position of each of the at-least-one target device by calculating the distance between the target device and each of the at-least-one reference device based on at least the times-of-arrival of the low-speed wireless signals, each time-of-arrival being the time that the corresponding low-speed wireless signal being received by the target device, and determining the position of the target device based on the calculated distances.

20 Claims, 7 Drawing Sheets

Related U.S. Application Data continuation of application No. 15/982,750, filed on May 17, 2018, now Pat. No. 10,627,479.

(60) Provisional application No. 62/507,722, filed on May 17, 2017.

(51) Int. Cl.
*G01S 5/02* (2010.01)
*H04W 4/029* (2018.01)
*G01S 5/00* (2006.01)

(52) U.S. Cl.
CPC ............ *H04W 4/02* (2013.01); *H04W 4/023* (2013.01); *H04W 4/025* (2013.01); *H04W 4/029* (2018.02); *G01S 5/018* (2020.05); *G01S 5/02522* (2020.05)

(58) Field of Classification Search
CPC ........ G01S 5/02; G01S 5/0252; G01S 5/0009; G01S 5/0284; G01S 5/0289; G01S 5/0027; G01S 5/16; G01S 5/18; G01S 5/20; G01S 5/26; G01S 1/76; G01S 2205/001; G01S 7/4808; G01S 1/028; H04W 4/025; H04W 4/029; H04W 4/02; H04W 4/023; H04W 4/021; H04W 64/00; H04W 64/003; H04W 64/006; H04W 40/38; H04W 84/18; H04W 84/20; H04W 4/38; H04W 4/026; H04W 64/005; H04W 88/08; H04W 92/18; H04W 88/02

See application file for complete search history.

(56) References Cited

U.S. PATENT DOCUMENTS

| | | | |
|---|---|---|---|
| 2002/0155845 A1* | 10/2002 | Martorana | 455/456 |
| 2007/0132577 A1* | 6/2007 | Kolavennu | 340/539.13 |
| 2009/0046013 A1* | 2/2009 | Yanagihara | 342/451 |
| 2013/0072219 A1* | 3/2013 | Zhang et al. | 455/456.3 |
| 2014/0309806 A1* | 10/2014 | Ricci | B60R 16/037 |
| 2015/0149042 A1* | 5/2015 | Cooper et al. | |
| 2016/0037300 A1* | 2/2016 | Vitek et al. | H04W 4/023 |
| 2016/0084938 A1* | 3/2016 | Doi et al. | G01S 5/20 |
| 2016/0112839 A1* | 4/2016 | Choi et al. | H04W 4/023 |
| 2016/0353251 A1* | 12/2016 | Yang et al. | H04W 4/046 |
| 2016/0360370 A1* | 12/2016 | Edge et al. | H04W 4/025 |
| 2017/0019525 A1* | 1/2017 | Hannon et al. | H04M 1/72577 |
| 2017/0026798 A1* | 1/2017 | Prevatt | H04W 4/023 |
| 2017/0131402 A1* | 5/2017 | Orlik et al. | G01S 15/025 |
| 2017/0135061 A1* | 5/2017 | Park et al. | H04W 64/00 |
| 2017/0171699 A1* | 6/2017 | Jin et al. | H04W 4/008 |
| 2018/0335502 A1* | 11/2018 | Lowe et al. | G01S 5/14 |
| 2019/0081698 A1* | 3/2019 | Sarraf et al. | H04B 7/24 |
| 2019/0103113 A1* | 4/2019 | LaBosco | G10L 15/22 |

OTHER PUBLICATIONS

Acoustic Positioning Method, Device and System For Airport Scene Target; CN 105785319 A (Year: 2016).*

* cited by examiner

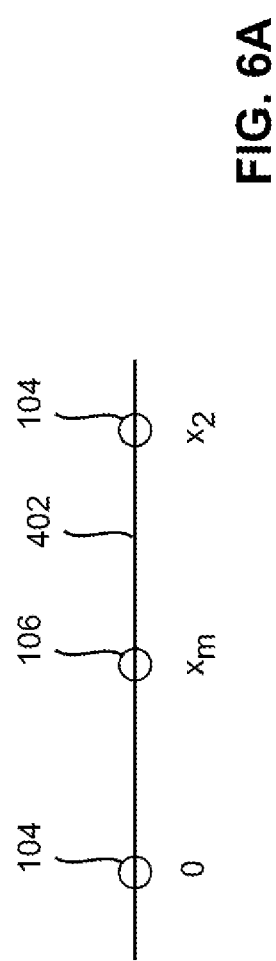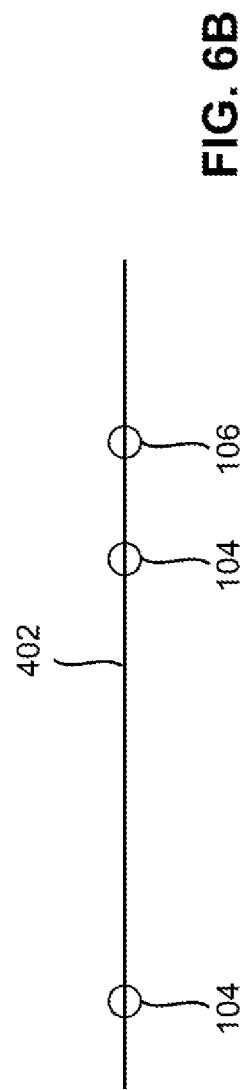

DISTANCE-BASED POSITIONING SYSTEM AND METHOD USING HIGH-SPEED AND LOW-SPEED WIRELESS SIGNALS

CROSS-REFERENCE TO RELATED APPLICATIONS

This application is a continuation of U.S. patent application Ser. No. 16/820,445, filed on Mar. 16, 2020, which claims the benefit of U.S. Provisional Patent Application Ser. No. 62/507,722, filed May 17, 2017, the content of each of which is incorporated herein by reference in its entirety.

FIELD OF THE DISCLOSURE

The present disclosure relates generally to positioning methods and systems, and in particular to fine-grade real-time positioning methods and systems.

BACKGROUND

Many indoor/outdoor positioning systems are known. An example of an outdoor positioning system is a Global Navigation Satellite System (GNSS) such as the Global Positioning System (GPS) of the United States, the Global Navigation Satellite System (GLONASS) of Russia, the Galileo positioning system of the European Union, and the BeiDou Navigation Satellite System of China. Other examples of indoor/outdoor positioning systems include positioning systems using received signal strength (RSS), inertial navigation systems (INS) using motion sensors (for example, accelerometers) and rotation sensors (for example, gyroscopes) for object positioning, pedestrian dead reckoning (PDR) using accelerometers as a pedometer and magnetometer as a compass for pedestrian navigation, SteamVR® optical position tracking technology developed by Valve Corporation of Bellevue, Wash., U.S.A. (SteamVR is a registered trademark of Valve Corporation), Oculus constellation tracking technology developed by Oculus VR of Irvine, Calif., U.S.A., and the OPTITRACK® camera-based positioning system developed by NaturalPoint, Inc. of Corvallis, Oreg., U.S.A. (OPTITRACK is a registered trademark of NaturalPoint, Inc.).

SUMMARY

Embodiments herein relate generally to positioning systems and in particular to fine-grade real-time positioning systems with applications in, but not limited to, general indoor positioning, smartphone positioning, room-scale positioning for virtual reality, augmented reality, and/or the like.

According to one aspect of this disclosure, there is provided a positioning system. The positioning system comprises an initiator device for emitting a high-speed wireless signal, at least one reference device, at least one target device, and at least one engine.

In some embodiments, each of the at-least-one reference device is configured for (1) receiving said high-speed wireless signal, and (2) emitting a low-speed wireless signal after receiving said high-speed wireless signal.

Each target device receives the low-speed wireless signals emitted from the reference devices. The at-least-one engine uses the arrival times of the received low-speed wireless signals for determining the position of the target device by: (i) calculating the distance between the target device and each reference device by using a suitable time difference of arrival (TDOA) method, and (ii) calculating the position of the target device based on the calculated distances between the target device and the reference devices.

In some embodiments, each target device also receives the high-speed wireless signal emitted from the initiator device. The at-least-one engine determines the position of the target device by: (i) calculating the distance between the target device and each reference device by using the time difference between the time of receiving the high-speed wireless signal and the time of receiving the low-speed wireless signal emitted from the reference device, and (ii) calculating the position of the target device based on the calculated distances between the target device and the reference devices.

In some embodiments, each target device further comprises at least one sensor for collecting data regarding of the motion status of the target device and/or the environmental status thereof. The at-least-one engine determines the position of the target device by: (i) calculating the distance between the target device and each reference device by using the arrival times of the received low-speed wireless signals and, if the target device is configured to also receive the high-speed wireless signal emitted from the initiator device, by also using the arrival time of the received high-speed wireless signal, and (ii) fusing the calculated distances with the data collected by the at-least-one sensor for determining the location of the target device.

In some embodiments, the high-speed wireless signal is a radio frequency (RF) signal.

In some embodiments, the low-speed wireless signal is an acoustic signal.

According to one aspect of this disclosure, there is provided a positioning system. The positioning system comprises an initiator device configured for emitting a high-speed wireless signal; at least one reference device each configured for (i) receiving the high-speed wireless signal, and (ii) emitting a low-speed wireless signal after receiving the high-speed wireless signal; at least one target device each comprising one or more components for receiving the low-speed wireless signals; and at least one engine configured for determining the position of each of the at-least-one target device by (1) calculating the distance between the target device and each of the at-least-one reference device based on at least the times-of-arrival of the low-speed wireless signals, each time-of-arrival being the time that the corresponding low-speed wireless signal being received by the target device; and (2) determining the position of the target device based on the calculated distances.

In some embodiments, the high-speed wireless signal is a radio frequency (RF) signal.

In some embodiments, the low-speed wireless signal is an acoustic signal.

In some embodiments, the at least one target device is movable.

In some embodiments, the at least one reference device is movable.

In some embodiments, the at least one engine is further configured for determining the position of the at least one movable reference device by using a simultaneous location and mapping (SLAM) method.

In some embodiments, the low-speed wireless signal comprises a unique characteristics for determining the identity of the corresponding reference device. Said unique characteristics may be a unique frequency, being encoded with a unique codeword, and/or being encoded with a unique coding scheme.

In some embodiments, the system further comprises one or more temperature sensors configured for obtaining temperature data for determining the speed of the low-speed wireless signal.

In some embodiments, the system further comprises a database for storing the obtained temperature data and the location associated thereof. The at least one engine is further configured for using the temperature data and the location associated thereof in the database for improving the accuracy of the position of the target device.

In some embodiments, said calculating the distance between the target device and each of the at-least-one reference device based on at least the times-of-arrival of the low-speed wireless signals comprises calculating the distance between the target device and each of the at-least-one reference device based on at least the times-of-arrival of the low-speed wireless signals and by using a TDOA method.

In some embodiments, each of the at-least-one target device further comprises one or more components for receiving the high-speed wireless signal emitted from the initiator device; and said calculating the distance between the target device and each of the at-least-one reference device based on at least the times-of-arrival of the low-speed wireless signals comprises calculating the distance between the target device and each of the at-least-one reference device based on the time difference at least between the time-of-arrival of the low-speed wireless signal emitted from the reference device and the time-of-arrival of the high-speed wireless signal emitted from the initiator device.

In some embodiments, the time difference is the time difference between the time-of-arrival of the low-speed wireless signal emitted from the reference device received by the target device and the time-of-arrival of the high-speed wireless signal emitted from the initiator device received by the target device, offset by a predefined constant.

In some embodiments, each of the at-least-one target device further comprises at least one sensor for collecting sensor data regarding at least one of the motion status of the target device and the environmental status thereof; and said determining the position of the target device based on the calculated distances comprises fusing the calculated distances with the collected sensor data for determining the location of the target device.

In some embodiments, the at-least-one sensor comprises one or more of an inertial-measurement unit (IMU), an accelerometer, a magnetometer, a barometer, a lux meter, a temperature sensor, a camera, and a near-field communication (NFC) receiver.

In some embodiments, the position of the target device is a position in a D dimensional space, where D=1, 2, or 3, and the system comprises N reference device(s), where N is a positive integer. Said fusing the calculated distances with the collected sensor data for determining the location of the target device comprises: (a) if N<D, fusing the calculated distances with the collected sensor data for determining the location of the target device; and (b) if N<D, obtaining an estimate of the target device position by using a statistic method, and fusing the estimated target device position with the collected sensor data for determining the location of the target device.

In some embodiments, the fusing in above step (a) or (b) comprises a particle filter, or Kalman Filter.

In some embodiments, the statistic method is a least squares (LS) method, a linearized least squares (LLS) method, or a Kalman filter method.

In some embodiments, the at least one engine is further configured for correcting errors of the IMU by using the calculated position of the target device.

In some embodiments, at least one of the at-least-one initiator device is one of the at-least-one target device.

In some embodiments, at least one of the at-least-one initiator device is one of the at-least-one reference device.

In some embodiments, at least one of the at-least-one engine is in one of the at-least-one target device.

In some embodiments, said emitting the low-speed wireless signal after receiving the high-speed wireless signal comprises emitting the low-speed wireless signal immediately after receiving the high-speed wireless signal.

In some embodiments, each of the at-least-one reference device is configured for emitting the low-speed wireless signal after a determined delay from receiving said high-speed wireless signal.

In some embodiments, each of the at-least-one reference device is further configured for emitting another high-speed wireless signal after receiving said high-speed wireless signal from the initiator device.

In some embodiments, the system comprises a plurality of reference devices, and the emission of the low-speed wireless signals from the plurality of reference devices are synchronized therebetween.

In some embodiments, said synchronization is conducted through a wireless, synchronization signal.

In some embodiments, the system comprises one or more barometers for obtaining barometric pressures of two or more reference devices for determining the height differences between the two or more reference devices.

In some embodiments, the positioning system further comprises a database storing the information of the at-least-one reference device; and the at-least-one engine is configured for querying the database and excluding the low-speed signal emitted from any reference device that is marked as defective in the database.

In some embodiments, the at least one engine is configured for associating each calculated distance with a quality factor for measuring the accuracy of the calculated position.

In some embodiments, quality factor is a signal-to-noise ratio (SNR) of the low-speed signal, a SNR of the high-speed signal, or a combination thereof.

In some embodiments, said determining the position of the target device based on the calculated distances comprises weighting each calculated distance; and determining the position of the target device based on the calculated distances and the weights thereof.

In some embodiments, said determining the position of the target device based on the calculated distances and the weights thereof comprises determining the position of the target device based on the calculated distances and the weights thereof by using a weighted least squares (WLS) method.

According to one aspect of this disclosure, there is provided a method for determining the position of a target device. The method comprises emitting a high-speed wireless signal; receiving the high-speed wireless signal at one or more locations; emitting one or more low-speed wireless signals from the one or more locations after receiving the high-speed wireless signal; receiving the low-speed wireless signals at the target device; for each of the one or more low-speed wireless signals, calculating the distance between the target device and the corresponding location based on at least the time-of-arrival of the low-speed wireless signal, said time-of-arrival being the time that the low-speed wireless signal being received by the target device; and determining the position of the target device based on the calculated distances.

In some embodiments, the high-speed wireless signal is a radio frequency (RF) signal.

In some embodiments, the low-speed wireless signal is an acoustic signal.

In some embodiments, said for each of the one or more low-speed wireless signals, calculating the distance between the target device and the corresponding location based on at least the time-of-arrival of the low-speed wireless signal comprises, for each of the one or more low-speed wireless signals, calculating the distance between the target device and the corresponding location based on at least the time-of-arrival of the low-speed wireless signal and by using a time difference of arrival (TDOA) method.

In some embodiments, the method further comprises receiving the high-speed wireless signal at the target device; and wherein said for each of the one or more low-speed wireless signals, calculating the distance between the target device and the corresponding location based on at least the time-of-arrival of the low-speed wireless signal comprises, for each of the one or more low-speed wireless signals, calculating the distance between the target device and the corresponding location based on the time difference at least between the time-of-arrival of the low-speed wireless signal emitted from the location and the time-of-arrival of the high-speed wireless signal.

In some embodiments, the method further comprises collecting data regarding of at least one of the motion status of the target device and the environmental status thereof; and fusing the calculated distances or calculated position with the collected data for determining the location of the target device.

In some embodiments, said emitting the high-speed wireless signal comprises emitting the high-speed wireless signal from the target device.

In some embodiments, said for each of the one or more low-speed wireless signals, calculating the distance between the target device and the corresponding location based on at least the time-of-arrival of the low-speed wireless signal comprises, for each of the one or more low-speed wireless signals, calculating, by the target device, the distance between the target device and the corresponding location based on at least the time-of-arrival of the low-speed wireless signal; and said determining the position of the target device based on the calculated distances comprises determining, by the target device, the position of the target device based on the calculated distances.

In some embodiments, said emitting the low-speed wireless signal after receiving the high-speed wireless signal comprises emitting the low-speed wireless signal after a determined delay from receiving said high-speed wireless signal.

In some embodiments, the method further comprises storing the information of the at-least-one reference device in a database; and querying the database and excluding the low-speed signal emitted from any reference device that is marked as defective in the database.

BRIEF DESCRIPTION OF THE DRAWINGS

FIGS. 6A and 6B show two examples of a one-dimensional space;

DETAILED DESCRIPTION

Figure 1:
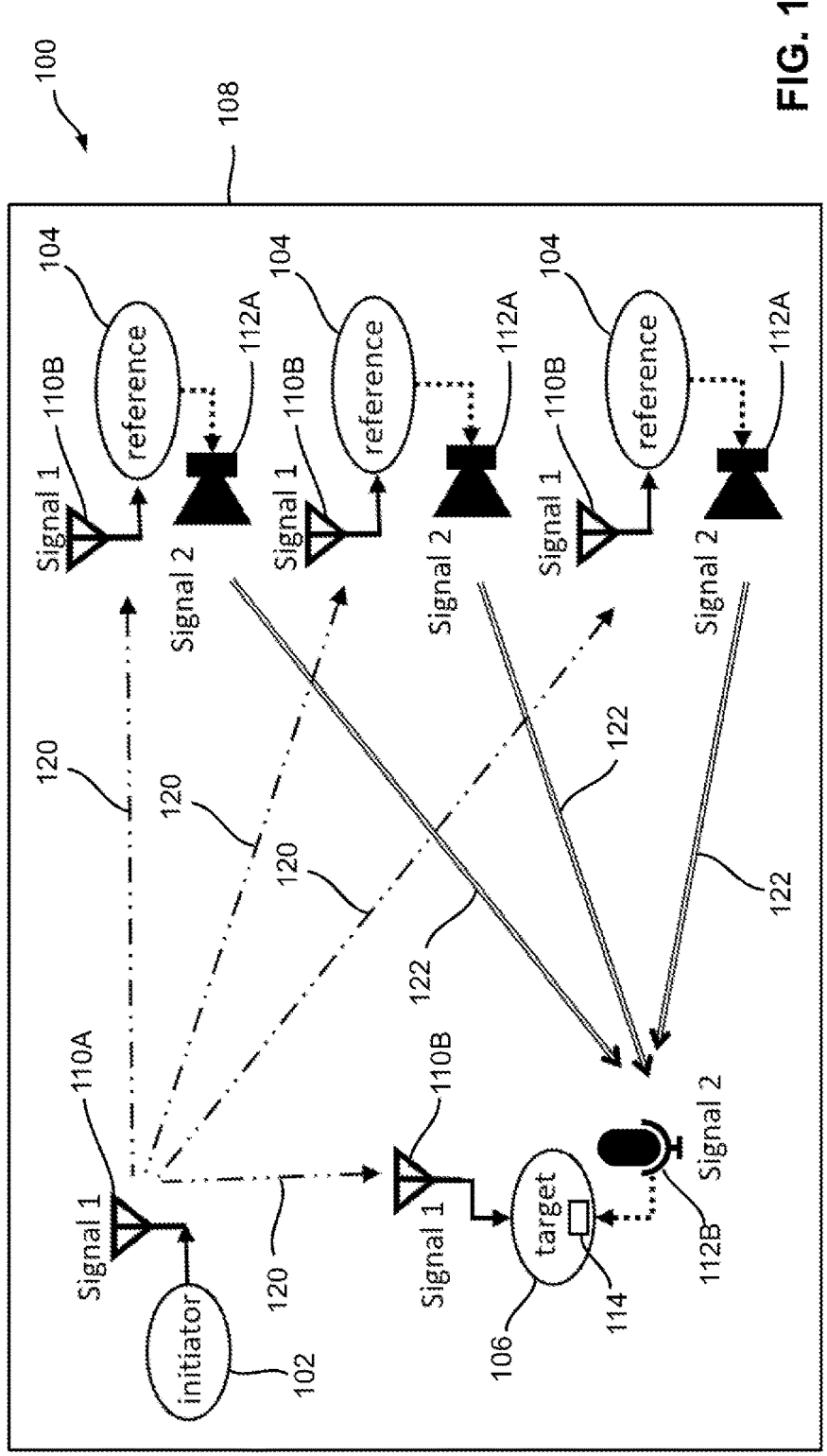
FIG. 1 is a schematic diagram of a positioning system having one or more reference devices, one or more initiator devices and one or more target devices in a site, according to some embodiments of the present disclosure.

Turning now to FIG. 1, a positioning system is shown and is generally identified using reference numeral 100. In some embodiments, the positioning system 100 comprises a plurality of movable initiator devices 102, a plurality of reference devices 104 at fixed and known positions, and a plurality of movable target devices 106, all in a site 108 such as an indoor environment. Hereinafter, the plurality of reference devices 104 may also be denoted as anchor nodes or fixed nodes, and the plurality of movable target devices 106 may also be denoted as mobile nodes.

In these embodiments, each initiator device 104 comprises a wireless communications unit 110A such as a radio frequency (RF) transmitter for emitting a high-speed wireless signal such as a RF signal. Each reference device 104 comprises a wireless communications unit 110B such as a RF receiver, and an acoustic-emitting unit 112A such as a speaker for emitting a low-speed wireless signal such as an acoustic signal. The acoustic signal may be an ultrasonic signal in some embodiments, or in some other embodiments may be an acoustic signal at a lower frequency such as below the ultrasonic frequency range, depending on the implementation.

Each target device 106 comprises a wireless communications unit 110B such as a RF receiver, an acoustic-sensing unit 112B such as a microphone, and at least one sensor 114 for collecting data regarding of the motion status of the target device 106 and/or the environmental status thereof. For example, in these embodiments, each target device 106 comprises an inertial-measurement unit (IMU) 114 having one or more accelerometers and/or one or more gyroscopic/rate-gyro sensors (not shown).

To determine the position of a target device 106, an initiator device 102 broadcasts an initiating-measurement RF signal 120 via its RF transmitter 110A. The initiating-measurement RF signal 120 may be broadcast manually for example, by pressing a button of the initiator device 102, or automatically in regular or irregular time intervals (for example, periodically or randomly).

The initiating-measurement RF signal 120 is received by the reference devices 104 and the target device 106 via their respective RF receivers 110B. Upon receiving the initiating-measurement RF signal 120, each reference device 104 emits an acoustic signal 122 using its speaker 112A. In these embodiments, the acoustic signal 122 emitted from each reference device 104 comprises a unique characteristics for determining the identity of the corresponding reference device 104. Such characteristics may be for example, a unique frequency, being encoded with a unique codeword, being encoded with a unique coding scheme, and/or the like.

Upon receiving the initiating-measurement RF signal 120 at the time $t_{RF}$, each target device 106 starts to monitor the acoustic signals received by the microphone 112B. When an acoustic signal 122 emitted from the n-th reference device 104 (denoted as the n-th acoustic signal, n=1, 2, . . . , N where N is the number of the reference devices 104) is received, the target device 106 determines the identity of the corresponding reference device 104 and calculates the time difference $\Delta T_n$ between the receiving time $t_{ACn}$ of the n-th acoustic signal 122 and the receiving time $t_{RF}$ of the RF signal 120 as:

$$\Delta T_n = t_{ACn} - t_{RF}. \quad (1)$$

As the RF signal 120 propagates at the speed of light, the time difference between the time that the target device 106 receives the RF signal 120 and the time that the n-th reference device 104 receives the RF signal 120 is small and is thus omitted in these embodiments. Then, the distance between the movable target device 106 and the n-th reference device 104 is calculated as:

$$\tilde{r}_{mn} = v_{AC} \Delta T_n. \quad (2)$$

where $v_{AC}$ is the velocity of the acoustic signal 122. In some embodiments, a predefined speed of sound is used as $v_{AC}$, which is approximately 343.4 m/s in air at 20° C.

In some embodiments, a localized acoustic signal speed $v_{AC}$ is calculated as:

$$v_{AC} \approx 331.4 + 0.6 T_s, \quad (3)$$

where $T_s$ is the ambient air temperature in degrees Celsius.

The time difference $\Delta T_n$ may be calculated using any suitable methods. For example, in some embodiments, the time difference $\Delta T_n$ is calculated using a suitable statistic method such as the method described in Applicant's co-pending U.S. patent application Ser. No. 15/411,935, entitled "RANGE-FINDING AND OBJECT-POSITIONING SYSTEMS AND METHODS USING SAME," filed on Jan. 20, 2017, the content of which is incorporated herein by reference in its entirety.

After calculating the distances between the target device 106 and each of the N reference devices 104 using Equation (2), the position of the target device 106 may be determined based on these calculated distances by, for example, using trilateration, or more generally, multilateration, or alternatively, least squares adjustment and the like. Depending on the number N of the reference devices 104 and other relevant constraints, the determined position of the target device 106 may be a point in a 3D space, a point on a 2D plane, a point on a 1D space (for example, on a line), a circle, an area, or the like.

For example, if N=1 (i.e., only one reference device 104 is used), the positioning system 100 may determine that the target device 106 is on a circle (in cases for position determination in a 2D space) or a sphere (in cases for position determination in a 3D space) centered at the reference device 104 and with a distance of $\tilde{r}_{mn}$ calculated using Equation (2).

Figure 2:
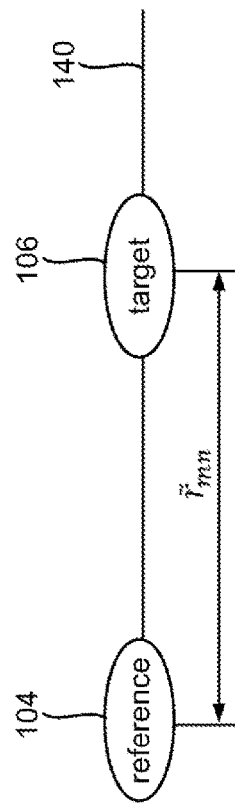
FIG. 2 is a schematic diagram showing the position of a target device of the system shown in FIG. 1, moving along a one-dimensional space.

In another example shown in FIG. 2, if the positioning system 100 has known that the target device 106 is moving from a known direction along a known line 140 crossing the n-th reference device 104, the position of the target device 106 in a one-dimensional (1D) space along the line 140 is thus calculated.

Hereinafter, for ease of description and without any loss of generality, a local coordinate system is used as needed in which the n-th reference device 104 is at the origin of the coordinate system, and the line 140 corresponds to the x-axis thereof.

Those skilled in the art will appreciate that the estimated range $\tilde{r}_{mn}$ usually contains estimation errors due to factors such as measurement noise, fixed and/or random variable delay between different parts of hardware units, and the like. Thus, the estimated range $\tilde{r}_{mn}$ may be written as $\tilde{r}_{mn} = r_{mn} + \eta$ where $r_{mn}$ is the actual range between the target device 106 and the n-th reference device 104, and 77 denotes the range-estimation error.

As described above, in some embodiments, the target devices may comprise a sensor 114 such as an IMU, an accelerometer and/or other ancillary sensors including but not limited to magnetometers, barometers, lux meters, temperature sensors, cameras, near-field communication (NFC) receiver, and the like. Data of these sensors may be fused with the range and/or position estimate for further improving the accuracy of the estimated position of the target device 106.

Figure 3:
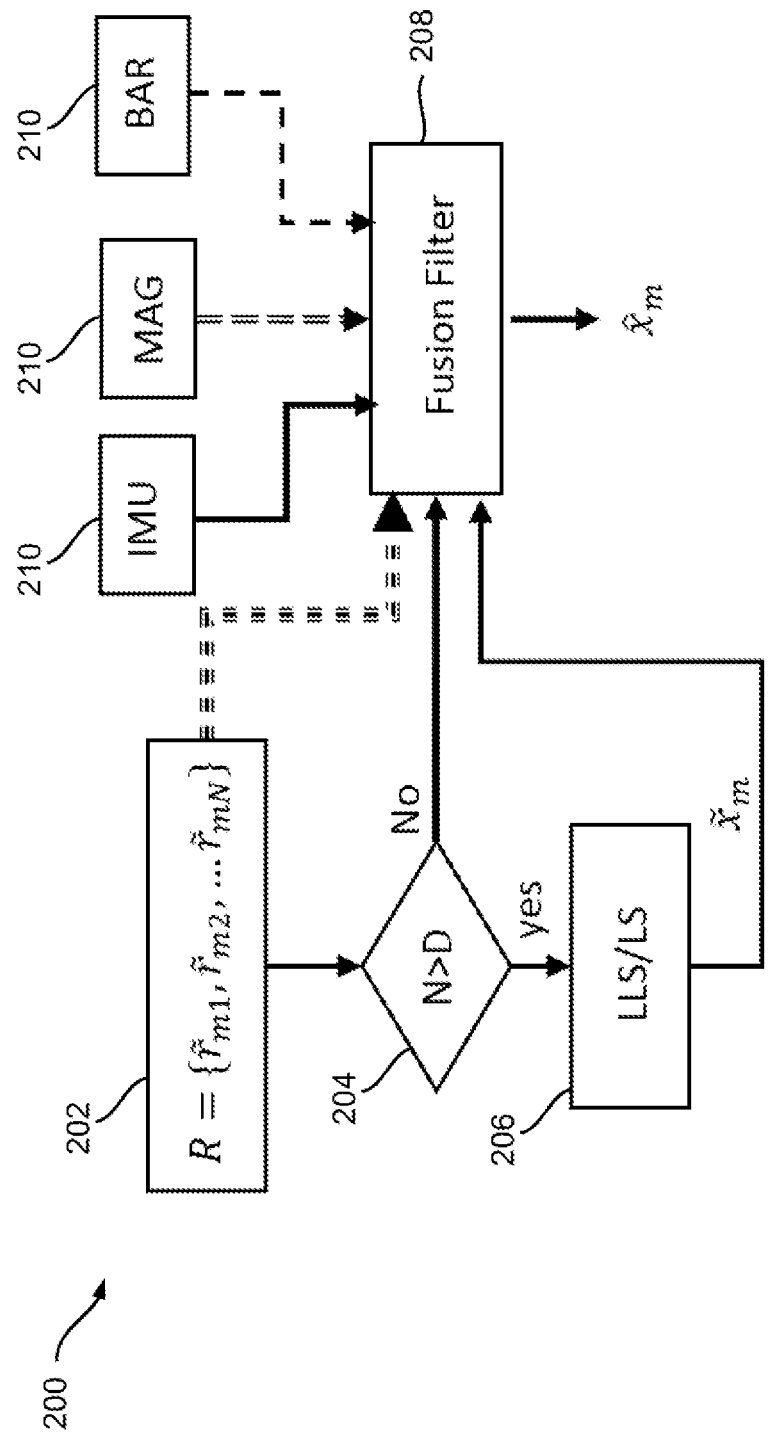
FIG. 3 is a block diagram showing a target device position estimation process executed by the target device of the system shown in FIG. 1, for estimating the position thereof in a D dimensional coordinate system wherein D may be one, two or three.

FIG. 3 is a block diagram showing a target-device-position estimation process 200 executed by the target device 106 for estimating the position thereof in a D dimensional coordinate system using range measurements between the target device 106 and N reference devices 104 with a priori position information, where D may be one (i.e., the target device 106 moving along a known line), two (i.e., the target device 106 moving on a two-dimensional plane), or three (i.e., the target device 106 moving in a three-dimensional space).

In these embodiments, the a priori position information includes a priori positions of the reference devices 104. Such a priori positions of the reference devices 104 can be precise (e.g. at fixed positions) or alternatively less accurate, in which case a probability distribution function (PDF) of the reference device position can be used to describe the statistics of such position estimate.

As shown, the estimated distances $\tilde{r}_{mn}$ between the target device 106 and the N reference devices 104 are first obtained using Equation (2) (step 202), in which the acoustic signal speed $v_{AC}$ may take any appropriate values in various embodiments. For example, in some embodiments, a predefined speed of sound may be used as $v_{AC}$ for calculating the estimated distances $\tilde{r}_{mn}$. In some other embodiments, a localized acoustic signal speed $v_{AC}$ may be calculated and used for calculating the estimated distances $\tilde{r}_{mn}$. In yet some other embodiments, a suitable statistic method such as that described in U.S. patent application Ser. No. 15/411,935 may be used for calculating the estimated distances $\tilde{r}_{mn}$ with improved accuracy.

At step 204, the target device 106 checks whether or not N is greater than D. If N is not greater than D, the process goes to step 208.

If at step 204, it is determined that N is greater than D, then a statistic method such as a least squares (LS) method, a linearized least squares (LLS) method, or a Kalman filter method, is used to obtain a first estimate of the target device position $\tilde{x}_m$ (step 206). Herein, $\tilde{x}_m$ is a scalar quantity if D=1, and is a two-dimensional or three-dimensional vector if D=2 or D=3, respectively. The process then goes to step 208.

At step 208, a fusion filter is used to fuse the sensor data obtained from various sensors 210 such as IMUs 114, magnetometers, barometers and the like with the estimated distances $\tilde{r}_{mn}$ or the estimated target device position $\tilde{x}_m$ to obtain a further improved target device position $\hat{x}_m$. Herein, $\hat{x}_m$ is a scalar quantity if D=1, and is a two-dimensional or three-dimensional vector if D=2 or D=3, respectively. Those skilled in the art will appreciate that, depending on implementation, some sensors 210 may be associated with respective target device 106 and movable therewith, and some other sensors may be deployed at predefined locations and do not movable with any target devices 106.

In some embodiments, the sensor data obtained from various sensors 210 may be fused with the estimated distances $\tilde{r}_{mn}$ and the estimated target device position $\tilde{x}_m$ at multiple stages to obtain a further improved target device position $\hat{x}_m$. For example, some sensor data may be fused with the estimated distances $\tilde{r}_{mn}$ to obtain an estimated target device position, which may later be fused with some other sensor data for further improving the estimation accuracy.

An example of the target-device-position estimation process 200 is now described, wherein D=1. The target device 106 comprises an accelerometer 114 movable therewith such that the acceleration-measuring axis of the accelerometer 114 is parallel to the x-axis of the local coordinate system. Those skilled in the art will appreciate that such accelerometer placement is not a limitation on the system 100 nor on the methods described herein since the value of acceleration along axes of an arbitrary coordinate system, for example a local-level frame, can be determined by mapping measured acceleration(s) to their components along a local-level frame using the estimated Euler angles and/or quaternion that represent such rotation. There exists various known methods for determining the rotation between the inertial frame and a local-level frame, for example, methods based on extended Kalman Filtering and fusion of three-axis accelerometer and three-axis gyro/rate-gyro and/or three-axis magnetometer.

In various embodiments, the system 100 may use the range estimate to correct for IMU errors, use IMU data to smooth position solutions, use IMU data to provide interim position solutions, or use a range/position solution and IMU data in refining the final position solution. As is known in the art, in some positioning systems such as INS and PDR, IMU errors and/or drifting may cause the estimated position of a movable object to offset from the actual position thereof. In some embodiments, such systems may be combine with above-described positioning/ranging system and method for correcting IMU errors and/or for correcting the positioning offset caused by IMU errors.

For example, in some embodiments, a host-processing engine of the target device 106 fuses range measurements $\tilde{r}_{mn}$ with sensor measurements obtained by sensors 210 to improve positioning accuracy. In the example described below, range measurements $\tilde{r}_{mn}$ are used to correct for inertial sensor errors, e.g. bias and bias drift, thereby providing improved positioning accuracy.

Let $a_m$ denote the vector acceleration associated with IMU measurements of a mobile target node m along the x-axis of a local-level frame. Also, let $\delta x'_m$, $\delta v'_m$, and $\delta a'_m$ denote the time-rate of change (i.e., the rate of change over time) of the 1D vector position error $\delta x_m$, velocity error $\delta v_m$, and accelerometer error $\delta a_m$ associated with the target node m, respectively, such that:

$$\delta x'_m = \delta v_m;$$

$$\delta v'_m = \delta a_m. \tag{4}$$

In this embodiment, accelerometer errors are modeled using a first-order Markov process as:

$$\delta a'_m = -\beta_m \delta a_m + w_m \sqrt{2\beta_m \sigma_m^2} \tag{5}$$

where $\beta_m$ is the reciprocal of the correlation time of the Markov process, $\sigma_m^2$ is the variance of the white noise associated with the process, and $w_m$ is uncorrelated White Gaussian Noise (WGN) of unit variance.

In this embodiment, an Error-State Kalman Filter (ESKF), also known as Indirect Kalman Filter (IKF), is used to fuse the range measurements $\tilde{r}_{mn}$ with the accelerometer output $a_m$. Equations (4) and (5) form a first order differential equation that describes the error state of the inertial system, given in matrix notation as:

$$\underbrace{\begin{bmatrix} \delta x_m \\ \delta v_m \\ \delta a_m \end{bmatrix}}_{\dot{x}_m} = -\underbrace{\begin{bmatrix} 0 & 1 & 0 \\ 0 & 0 & 1 \\ 0 & 0 & -\beta_m \end{bmatrix}}_{A_m} \underbrace{\begin{bmatrix} \delta x_m \\ \delta v_m \\ \delta a_m \end{bmatrix}}_{x_m} + w_m, \tag{6}$$

where $$w_m = \begin{bmatrix} 0 \\ 0 \\ w_m \sqrt{2\beta_m \sigma_m^2} \end{bmatrix}.$$

The solution to the error-state differential equations given in Equation (6) can then be used to formulate an error-state propagation equation which in this embodiment is given as:

$$\begin{bmatrix} \delta x_m[k \mid k-1] \\ \delta v_m[k \mid k-1] \\ \delta a_m[k \mid k-1] \end{bmatrix} = \Phi \begin{bmatrix} \delta x_m[k-1 \mid k-1] \\ \delta v_m[k-1 \mid k-1] \\ \delta a_m[k-1 \mid k-1] \end{bmatrix}, \tag{7}$$

Where k is the index of the error state, $$\Phi = \exp(A_m \Delta t) \tag{8}$$

with $A_m$ defined in Equation (6), and $\Delta t$ denotes the elapsed time between two subsequent updates, k−1 and k.

The measured range $\tilde{r}_{mn}$ is related to the error state variables as:

$$\Psi[k] = \tilde{r}_{mn}[k] - r_{INS}[k] = H \begin{bmatrix} \delta x_m[k] \\ \delta v_m[k] \\ \delta a_m[k] \end{bmatrix} + \eta, \tag{9}$$

where H=[1, 0, 0], and $\eta$ is the range measurement error, defined earlier. Also, $r_{INS}$ denotes the range estimate (in this embodiment also the 1D position estimate) based on the inertial navigation system (in this embodiment the position based on the accelerometer). The error-state variables can now be updated as:

$$\begin{bmatrix} \delta x_m[k \mid k] \\ \delta v_m[k \mid k] \\ \delta a_m[k \mid k] \end{bmatrix} = \begin{bmatrix} \delta x_m[k \mid k-1] \\ \delta v_m[k \mid k-1] \\ \delta a_m[k \mid k-1] \end{bmatrix} + K \begin{bmatrix} \Psi[k] - H \begin{bmatrix} \delta x_m[k \mid k-1] \\ \delta v_m[k \mid k-1] \\ \delta a_m[k \mid k-1] \end{bmatrix} \end{bmatrix}, \tag{10}$$

where K is the Kalman gain given as:

$$K = \frac{P[k|k-1]H^T}{HP[k|k-1]H^T + \sigma_{dB}^2}, \quad (11)$$

where $\sigma_{dB}^2 = E[\eta\eta^H]$ and P is the error-state propagation covariance that denotes the accuracy of error-state prediction and is given as:

$$P[k|k-1] = \Phi P[k-1|k-1]\Phi + Q, \quad (12)$$

where Q is the 3×3 diagonal matrix of noise covariance with the 3 diagonal elements associated with the target node m given as:

$$Q_{diag} = \Delta t[0,0,2\beta_m \sigma_m^2]. \quad (13)$$

The accuracy of the Kalman Filter update is depicted in the prediction covariance which is given as (the Joseph form):

$$P[k|k] = [I_3 - KH]P[k|k-1][I_3 - KH]^T + \sigma_{dB}^2 KK^T, \quad (14)$$

where $I_3$ is a 3-by-3 identity matrix. Finally, the updated positions are:

$$x_m[k] = r_{INS}[k] + \delta x_m[k|k]. \quad (15)$$

Those skilled in the art will appreciate that various alternative embodiments are readily available. For example, in some alternative embodiments, various suitable Bayesian methods such as particle filter, other forms of Kalman Filter, and the like, may be used for fusing IMU data with range measurements.

Those skilled in the art will appreciate that the number of reference devices 104 and target devices 106 and/or the dimensionality of the space (e.g. 1D, 2D, 3D) are not restricted and any of these parameters can vary in alternate embodiments.

In above embodiments, the time difference between the time that the target device 106 receives the RF signal 120 and the time that the n-th reference device 104 receives the RF signal 120 is omitted. In some alternative embodiments, such a time difference is approximated by a predetermined constant value $\Delta T_{RF}$ which may be a positive number or a negative number depending on whether the n-th reference device 104 receives the RF signal 120 after or before the target device 106. $\Delta T_{RF}$ is then used in calculating the time difference $\Delta T_n$ as:

$$\Delta T_n = t_{ACn} - (t_{RF} + \Delta T_{RF}), \quad (16)$$

which is used for calculating the distance between the target device 106 and the n-th reference device 104 as described above.

In the above embodiments, the initiator device 102 is a device particularly dedicated for emitting the initiating-measurement RF signal 120. In some embodiments, at least some of the target devices 106 may sometimes act as the initiator devices 102. In these embodiments, each of the target devices 106 that may sometimes act as an initiator device 102 may also comprise a wireless communication component 110A such as a RF transmitter.

In some embodiments, at least some of the reference devices 104 may sometimes act as the initiator devices 102. In these embodiments, each of the reference devices 104 that may sometimes act as an initiator device 102 may also comprise a wireless communication component 110A such as a RF transmitter.

In above embodiments, each reference device 104 emits the acoustic signal 122 immediately after the reception of the initiating-measurement RF signal 120. In some alternative embodiments, each reference device 104 emits the acoustic signal 122 after a mutually known delay $T_D$ from the reception of the initiating-measurement RF signal 120. Correspondingly, the target device 106 monitors the microphone for detecting the acoustic signals 122 at the appropriate time to account for the delay. In these embodiments, $T_D$ may be automatically generated and stored in a local or remote storage device as a pre-defined delay, or alternatively may be derived from a pre-shared key using a HMAC-based one-time password (HOTP) algorithm, time-based one-time password (TOTP) algorithm or the like. In some embodiments $T_D$ or its progenitor may be communicated between each reference device 104 and target device 106 by means of the wireless communications link 120 or by other suitable means such as a WiFi® connection (WI-FI is a registered trademark of Wi-Fi Alliance, Austin, Tex., USA), cellular data connection, and the like. In other embodiments, $T_D$ may be unique to each reference device 104 and be known only to the respective reference device 104 and the target device 106. In some embodiments, $T_D$ may be stored or calculated in a cloud computing system and communicated to the reference device 104 and/or the target device 106 over a suitable internet connection.

In some alternate embodiments, the target device 106 does not comprise a motion or environmental sensor. In these embodiments, no fusion of sensor data with the range measurement is used, and the distance between the movable target device 106 and the n-th reference device 104 is calculated using Equation (2).

Figure 4:
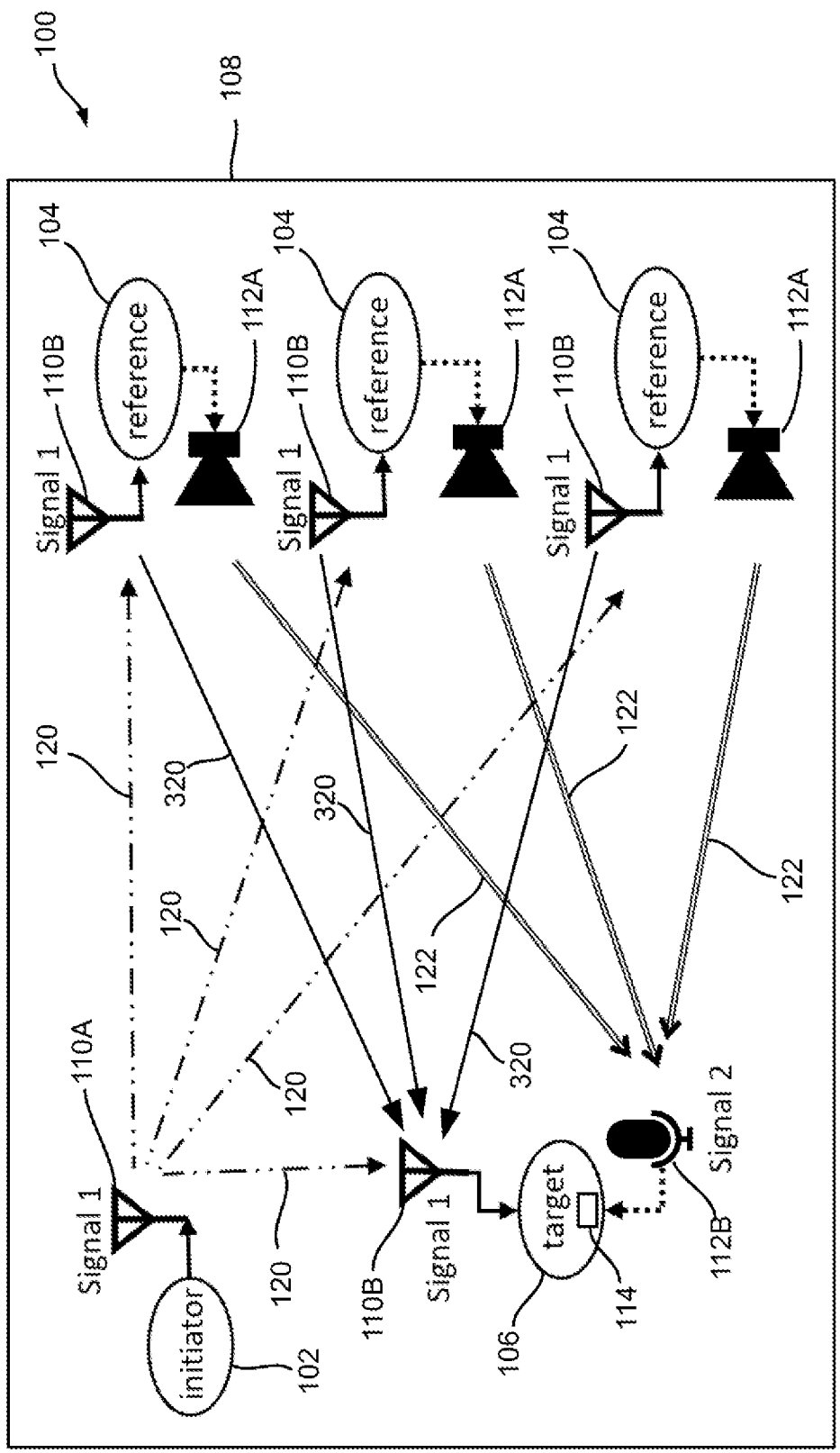
FIG. 4 is a schematic diagram of a positioning system, according to some embodiments of the present disclosure.

In some alternate embodiments as shown in FIG. 4, immediately after receiving the initiating-measurement RF signal 120, each reference device 104 emits both a RF signal 320 and an acoustic signal 122. The target device 106 starts to monitor the microphone 112B after reception of the RF signal 320. The target device 106 calculates its range based on the received RF signal 320 and the acoustic signal 122 using the methods described in above-mentioned U.S. patent application Ser. No. 15/411,935. The calculated range is combined or fused with data collected by the sensors 210 using the methods described above.

In some alternative embodiments, each reference device 104 emits the RF signal 320 and the acoustic signal 122 after a predefined delay $T_E$ from the reception of the initiating-measurement RF signal 120. $T_E$ may be determined in the same fashion as $T_D$, as described in the above embodiments.

In some alternative embodiments, the acoustic signal 122 is emitted after a predefined delay $T_F$ from the transmitting of the RF signal 320.

In some alternative embodiments, any of the above-described delays may not be predefined. Rather, they may be dynamically determined, e.g. randomly, pseudo-randomly, and the like, but are transmitted to the target device 106 for position calculation. In some alternative embodiments, any of the above-described delays may be dynamically determined by the target device 106 and transmitted to the reference devices 104 for use. Communication of the delay may be made over any suitable communication channel as may be available, for instance, via the RF channel 120, via a Wi-Fi® or cellular data network, or other suitable means.

Figure 5:
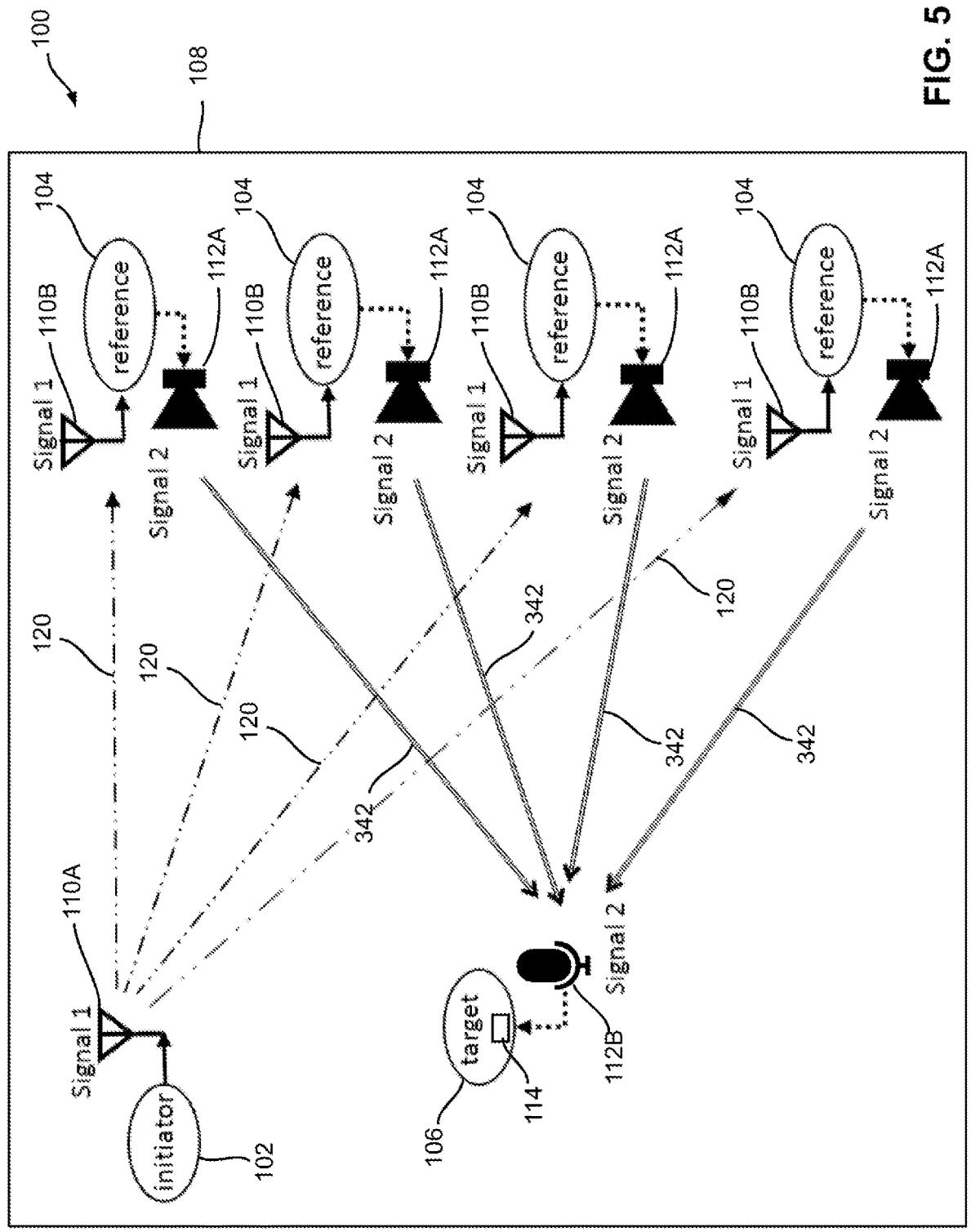
FIG. 5 is a schematic diagram of a positioning system, according to yet some other embodiments of the present disclosure.

In some alternative embodiments as shown in FIG. 5, the target device 106 does not comprise a RF receiver. Each reference device 104 emits a coded acoustic signal 342 immediately after they receive the initiating-measurement RF signal 120 emitted from the initiator device 102.

In these embodiments, the target device 106 records the coded acoustic signals 342 or a portion thereof. The precise start time of the recording by the target devices 106 is arbitrary as long as it precedes the arrival of the acoustic signal 342. As such, the processing engine in the target device 106 is not aware of the timing at which the acoustic signals 342 have been emitted. The processing engine in the target device 106 then estimates a set of pseudo-ranges corresponding to the set of recorded coded acoustic signals 342.

In these embodiments, time difference of arrival (TDOA) techniques may be used to find the position of the target devices 106. For example, in some embodiments the position of a target device 106 in a 1D space is needed. FIG. 6A shows an example of a 1D space 402 as a line crossing two reference devices 104, and the target device 106 moves on the 1D space 402 between the two reference devices 104. FIG. 6B shows another example of the 1D space 402 as a line crossing two reference devices 104, and the target device 106 moves on the 1D space 402 beyond the two reference devices 104.

In this embodiment, each reference device 104 emits a coded acoustic signal 342 via its acoustic emitting unit 112A regularly, periodically, irregularly, randomly, or after receiving the initiating-measurement RF signal 120 emitted from the initiator device 102.

After receiving the two coded acoustic signal 342 by the target device 106, two pseudo-range estimates may be obtained from the received acoustic signals 342 as:

$$\tilde{r}_{m1} = r_{m1} + \rho + \eta_{m1},$$

$$\tilde{r}_{m2} = r_{m2} + \rho + \eta_{m2}, \quad (12)$$

where $\rho$ is the range error due to clock bias between target device 106 and the reference devices 104, $\eta_{m1}$ and $\eta_{m2}$ are the range measurement errors between the target device 106 and each of the two reference devices 104. Without any loss of generality, in some embodiments it is assumed that one of the reference devices 104 is located at the center of the coordinate system, and the other of the reference devices 104 is located at the coordinates $(x_2, 0)$. Referring to FIG. 6A, one has:

$$\tilde{r}_{m1} = |x_m - 0| + \rho + \eta_{m1},$$

$$\tilde{r}_{m2} = |x_m - x_2| + \rho + \eta_{m2}. \quad (13)$$

Notwithstanding the ambiguity arising from the absolute value operator $|\times|$, the estimated position of the target node 106 may be given as:

$$\hat{x}_m = \frac{(\tilde{r}_{m1} - \tilde{r}_{m2} + x_2)}{2}, \text{ for } 0 < x_m < x_2. \quad (14)$$

Those skilled in the art will appreciate that suitable ambiguity resolution techniques based on increasing the number of reference devices 104 and/or above-described fusion with inertial sensor measurements may be employed for determining the position of the target devices 106.

Figure 7:
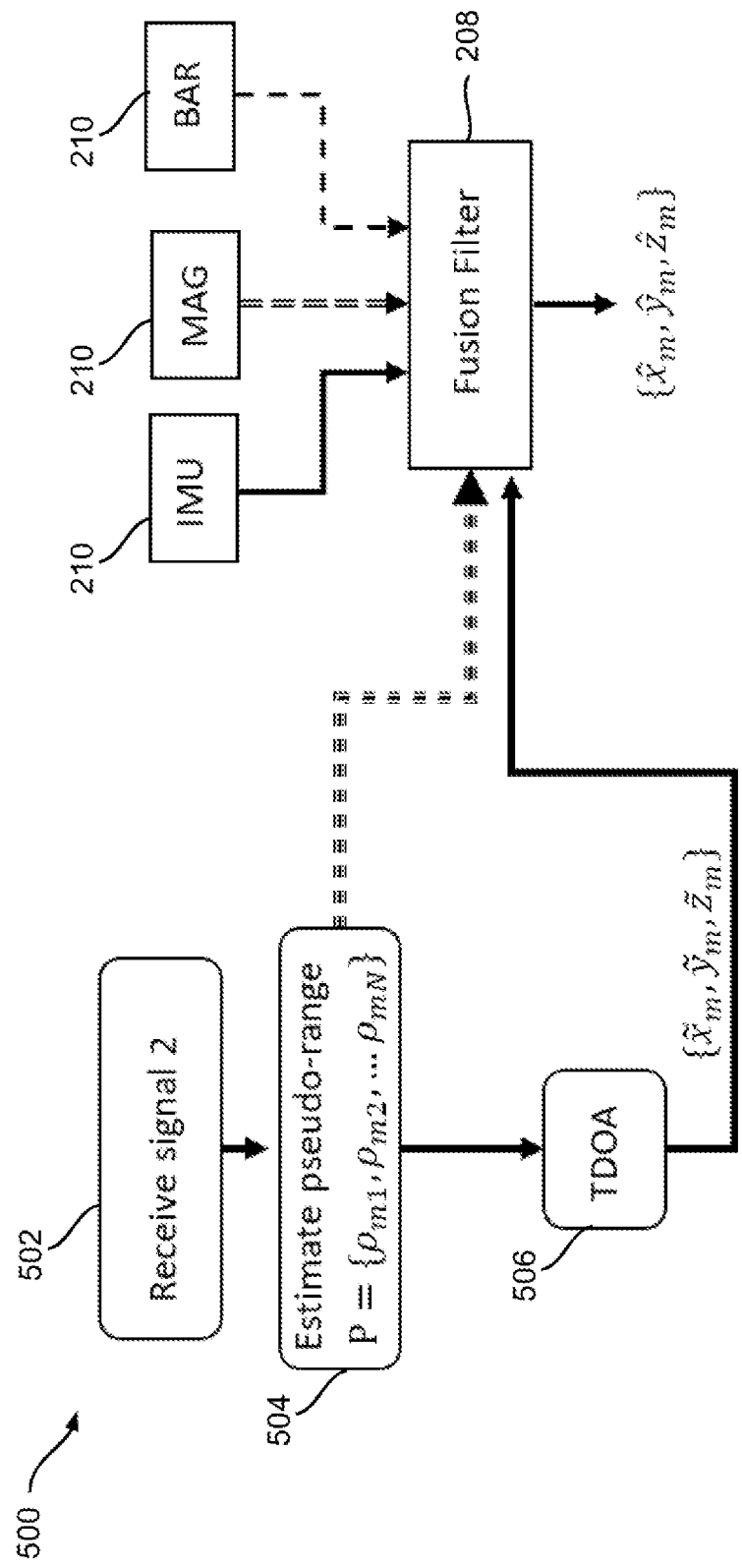
FIG. 7 is a block diagram showing a target device position-estimation process executed by the target device of the system shown in FIG. 5, for estimating the position thereof in a D dimensional coordinate system.

FIG. 7 is a block diagram showing a target-device-position estimation process 500 executed by the target device 106 of the system 100 shown in FIG. 5, for estimating the position thereof in a D dimensional coordinate system. As can be seen, the process 500 in these embodiments is similar to that shown in FIG. 3 except that in these embodiments, the target device 106 estimates a set of pseudo-ranges (step 504) based on the set of coded acoustic signals 342 received at step 502 and uses the above-described TDOA method at step 506 instead of or in addition to using LS or LLS.

The process 500 may also be used in embodiments where RF communications are not used in positioning the target devices 106. In the embodiments where one or more of the target devices or nodes 106 do not comprise RF communications capability (FIG. 5) and/or RF communications are not used in positioning the target devices 106, the coded acoustic signals may be transmitted by reference devices 104 on a regular or irregular basis. In some embodiments, the coded acoustic signals are emitted from the reference devices 104 simultaneously or at known delay(s) as described in earlier embodiments. The time synchronization between two or more of the reference devices 104 is done by means of transmitting a RF signal from one or more of the reference nodes 104 in the system. The time synchronization RF signal can be sent regularly or irregularly. The monitoring of the acoustic-sensing unit 112B by target device(s) 106 may be continuous, random, regular, manual, and the like.

In some embodiments, the locations of the reference devices 104 are embedded in the coded acoustic signal 342 for the target device 106 to use.

In some other embodiments, the target devices 106 obtains the locations of the reference devices 104 from a local or remote database (not shown). The database may be stored in a location of its memory, in the memory of a reference device 104, or stored in a server or cloud-computing system and accessible to the target device 106 by a suitable means such as a Wi-Fi® connection, cellular data connection (i.e. 3G, LTE, etc.) or any other suitable network connection.

In some embodiments, the positions of the reference devices 104 relative to a local coordinate system such as a local-level frame (LLF) are known. In these embodiments, the position of one or more of the target devices 106 is first determined using the methods described in above-mentioned U.S. patent application Ser. No. 15/411,935. Those skilled in the art will appreciate that many known positioning methods such as those based on linearized least squares (LLS) may be used for determining the position of a target device 106 based on measured ranges to reference devices 104.

In some embodiments, the estimated position of the target device 106 is fused with IMU sensor outputs using a Kalman Filter or other Bayesian filter to estimate the IMU errors. The estimated IMU errors may be used to improve the positioning accuracy of the overall solution. Alternatively, the estimated IMU errors may be used to correct IMU measurements for fusing with other sensor data for position calculation.

In some embodiments, the output of the Bayesian filter is the refined position of the target device 106.

In some embodiments, range estimates are directly fused with IMU measurements to determine the location of the target device 106.

In above embodiments, the host processing engine is in the target device 106. In some alternative embodiments, the host processing engine may be in a computing device separated from the target device 106, such as a centralized server, a cloud-computing service such as Amazon Elastic Compute Cloud 2, or the like, and accessible to the target device 106 through a suitable communication means such as a mesh network, Wi-Fi® connection, cellular data connection, and the like.

In some embodiments, one or more of the reference nodes 104 emit coded acoustic signals in regular or irregular time intervals. In these embodiments, the emitting of the coded acoustic signals is synchronized through a wireless synchronization signal transmitted from a master reference device 104. In some embodiments, the system 100 may comprise a plurality of master reference devices 104 for synchronizing the emitting of the coded acoustic signals. In other embodiments, the master reference device(s) 104 may comprise an Ethernet network interface or the like, for synchronizing the coded acoustic signals.

In some embodiments, target devices 106 start recording the incoming acoustic signals transmitted from reference devices 104, as soon as they receive the wireless synchronization signal from one or more of the master reference devices 104.

In some embodiments, one or more of the reference devices 104 may comprise one or more ancillary sensors such as magnetometer, barometer, temperature sensor, lux meter, proximity sensor, near-field communication (NFC) receiver, and the like. In these embodiments, ancillary sensor measurements are fused with range measurements and IMU sensor outputs for further refining the position of the movable target device 106. Those skilled in the art will appreciate that many Bayesian filters such as Kalman Filter, Particle Filter, and the like may be used for information fusion.

In some embodiments, barometric pressure may be used to determine the altitude or the altitude difference between the reference devices 104 and the target node 106. For example, in one embodiment, one or more reference devices 104 each comprise a barometer for measuring the barometric pressure at the location thereof. The measured barometric pressures may be used for determining height differences between these reference devices 104. In a related embodiment, the altitude of at least one of these reference devices 104 is known, and the altitude of other reference devices may then be calculated using the height differences therebetween.

In some embodiments, one or more target devices 106 and/or reference devices 104 initiate a request to determine a target device position. In these embodiments, the range measurement between the target device 106 and the reference devices 104 is then fused with IMU using a Bayesian filter such as a Kalman filter.

In some embodiments, a local or remote database and a priori knowledge of the position of a target device 106, such as a previously determined position thereof, INS, PDR, GNSS/GPS, coarse position information from BLUETOOTH® or Wi-Fi® fingerprinting (BLUETOOTH is a registered trademark of Bluetooth Sig Inc., Kirkland, Wash., USA), or the like, is used to exclude range measurements from specific reference devices 104 where such information would degrade the accuracy of the resultant position solution. In further embodiments, the target device 106 may update the database when it determines the accuracy of a given range measurement from a specific reference device or devices 104 is degraded at a given position. An example of such degradation is that the residual range error of a reference device becomes greater than a predetermined or dynamically-determined threshold.

In some embodiments, a local or remote database is used for storing the information of reference devices 104. When a reference device 104 becomes defective, malfunctioned, or otherwise the information thereof degrading the accuracy of the resultant position solution, the reference device is marked as defective in the database. Such defective reference devices 104 are excluded in determining the ranges/positions of the target devices 106.

In some embodiments, a local or remote map database, a ray-tracing engine (not shown) and a priori knowledge of the position of a target device 106 (such as described in the above embodiments), is used to exclude range measurement(s) from a specific reference device or devices 104 when it is determined that there is no line-of-sight between the reference device(s) 104 and the target device 106.

Figure 8:
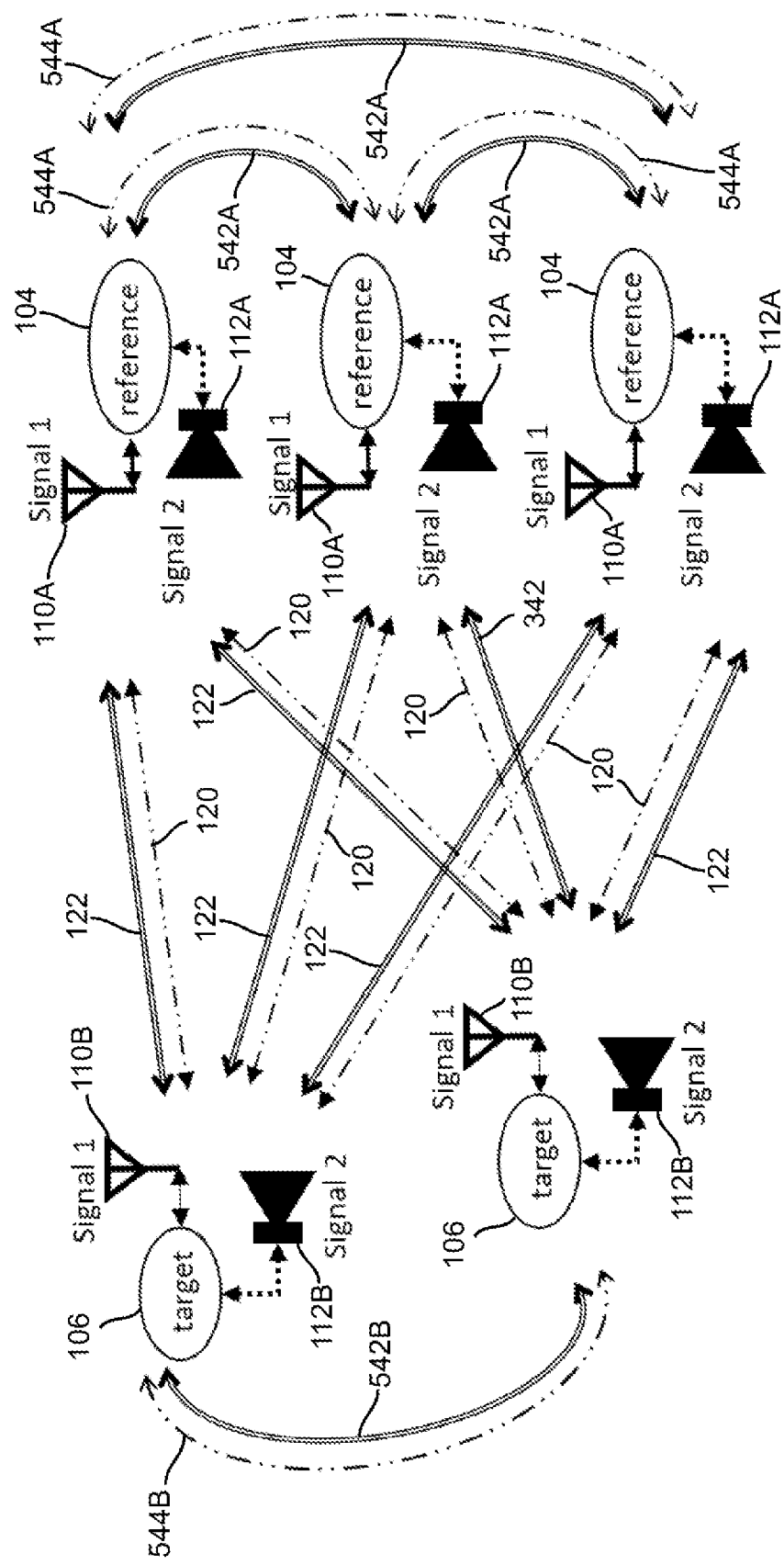
FIG. 8 is a schematic diagram illustrating a positioning system having one or more reference devices and one or more target devices in a site, according to some embodiments of the present disclosure.

In some embodiments, positioning is done cooperatively such that one or more reference devices 104 and/or target devices 106 share their range measurements and/or ancillary sensor measurements, as shown in FIG. 8. In these embodiments, each reference device 104 comprises a RF transceiver 110A and an acoustic transceiver 112A (for example, a speaker and a microphone). Each target device 106 also comprises a RF transceiver 110B and an acoustic transceiver 112B. The reference devices 104 are in communication with the target devices 106 via RF signals 120 and acoustic signals 122 for range determination as described above. For example, each of the reference devices 104 and target devices 106 may broadcast a RF signal 120 and an acoustic signal 122. Each target device 106 receives the RF signal 120 and the acoustic signal 122 broadcast from the reference devices 104, and each reference device 104 receives the RF signal 120 and the acoustic signal 122 broadcast from the target devices 106. Information related to the time-of-arrival differences between the RF signals 120 and corresponding acoustic signals 122 are shared between the reference devices 104 using RF signals 542A and/or acoustic signals 544A, and are shared between the target devices 106 using RF signals 542B and/or acoustic signals 544B, for determining ranges/positons of the target devices 106 and, if needed, one or more of the reference device 104.

In some embodiments, the positioning of one or more of the reference devices 104 and/or target devices 106 is calculated by a local or cloud-computing unit.

In some embodiments, a quality factor such as a weight accompanies one or more of the range measurements. In some embodiments the quality factor is a measure of the accuracy of the range estimate. In some embodiments, the quality factor is the signal-to-noise ratio (SNR) of the acoustic signal 122 or 342, the SNR of the RF signal 120 or 320, or a combination thereof.

In some embodiments, the quality factor is used in the process of range estimation. Those skilled in the art will appreciate that various suitable methods such as weighted least squares (WLS) may be used for incorporating the quality factors into the overall position estimation.

In some embodiments, map-matching techniques are incorporated to improve the positioning accuracy.

In some alternate embodiments, pedestrian dead-reckoning (PDR) methods are used to process the inertial-measurement unit data. The processed data is later fused with range measurements $\tilde{r}_{mn}$ as described above.

Although in above embodiments, the reference devices 104 are at fixed positions (anchor nodes), in some alternative embodiments, one or more reference devices 104 may be located at or movable to unknown locations. The system 100 tracks these reference devices 104 using suitable methods, and then uses their positions in positioning one or more target devices 106.

For example, in some embodiments, the reference devices 104 at unknown locations have the similar hardware configuration as any of the target devices 106 described above. For example, in some embodiments, one or more movable target devices (denoted as 106R) may act as reference devices for positioning one or more other target devices 106 as described above. In these embodiments, each of such target devices 106R that may sometimes act as a reference device 104 may also comprise an acoustic transmitter 112A such as a speaker. The system 100 uses above-described positioning methods for positioning and tracking these target devices 106R. Then, the locations of these target devices 106R are used for positioning other target devices 106.

In some embodiments, the positions of the reference devices 104 are unknown a priori. In these embodiments, a host-processing engine processes the range estimates between reference nodes 104 using a suitable simultaneous location and mapping (SLAM) method to determine the location of each reference device 104. In these embodiments, one or more of the reference devices 104 comprise one or more RF communications units 110B such as RF receivers, one or more acoustic emitting units 112A such as speakers, and one or more acoustic sensing unit 112B such as microphones. The target devices 106 in these embodiments may be similar to those described above. For example, one or more target devices 106 may comprise one or more acoustic receivers 112B such as microphones. Depending on the embodiments, one or more target devices 106 may also comprise RF communications units 110B such as RF receivers, and/or acoustic emitting units 112A such as speakers, as described above.

In some embodiments, the system 100 is also a camera-based SLAM system in which each target device 106 comprises a camera for navigation. For example, the target device may be a smart phone having a camera, a RF transceiver, a speaker, and a microphone. The smart phone runs thereon an augmented reality (AR) platform such as Apple ARKit or Google ARCore which captures image frames using the camera and a SLAM process for navigation. In these embodiments, the target device 106 also uses the RF transceiver, the speaker, and/or the microphone for ranging and positioning as described above. The ranging/positioning result is fused with the SLAM result for accurate positioning of the target device.

Although in above embodiments, the system 100 comprises a plurality of reference devices 104, in some alternative embodiments, the system 100 may only comprise one reference device 104.

Although in above embodiments, the system 100 comprises a plurality of initiator devices 102, in some alternative embodiments, the system 100 may only comprise one initiator device 102.

Although in above embodiments, the system 100 comprises a plurality of target devices 106, in some alternative embodiments, the system 100 may only comprise one target device 106.

As described above, temperature data obtained by the temperature sensors in the target devices 106 and/or the references devices 104 may be used for determining the speed of the acoustic signals 122 or 342 for accurate range determination. In some embodiments, the temperature data obtained by the temperature sensors of the movable target devices 106 is associated with the positions of the corresponding target device 106 and is logged or recorded over time. These logged temperature data forms historical temperature data over the site 108 which may be used for improving temperature estimation at various positions of the site 108.

In some embodiments, the system 100 also comprises a map calibration function for aligning a first, local coordinate system used by the system 100 with a second coordinate system such as a geographic coordinate system or the like. In this embodiment, the calibration function may be implemented in the form of a smartphone application. An operator may indicate through the smartphone calibration application where a given target device 106 is located in relation to the second coordinate system. In some embodiments, the smartphone may also be a target device 106 and the smartphone calibration application may obtain the location of the smartphone in the second coordinate system via another positioning function such as a GPS or an Assisted GPS (A-GPS) function. After obtaining the position in the first, local coordinate system, the position in the local coordinate system may be associated with that in the second coordinate system. After obtaining a sufficient number of diverse position points, a mapping between the first coordinate system and the second coordinate system may be established. Thus, future positions determined by the system 100 may be readily converted from the system's local coordinate system to the second coordinate system. Multiple independent systems 100 in which a mapping of each system's local coordinate system to a common second coordinate system has been determined (e.g. a geographic coordinate system) as described above, may also readily convert positions between each local coordinate system, even if they do not have overlapping of coverage areas. In other embodiments, such diverse points may be used to populate a database with error correction information which may be queried by the target device 106.

Although embodiments have been described above with reference to the accompanying drawings, those of skill in the art will appreciate that variations and modifications may be made without departing from the scope thereof as defined by the appended claims.

What is claimed is:

1. A system comprising:
   at least one reference device each configured for:
      emitting a low-speed wireless signal;
   at least one target device, each of the at-least-one target device comprising one or more components for receiving each low-speed wireless signal; and
   at least one engine for:
      calculating each of at least one distance between each of the at-least-one target device and a corresponding one of the at-least-one reference device based on at least a time-of-arrival of the low-speed wireless signal emitted from said corresponding one of the at-least-one reference device and a speed of the low-speed wireless signal calculated based on temperature data obtained from a database, the time-of-arrival of the low-speed wireless signal being the time that the low-speed wireless signal emitted from said corresponding one of the at-least-one reference device is received by the one of the at-least-one target device.

2. The system of claim 1, wherein the low-speed wireless signal is an acoustic signal.

3. The system of claim 1 further comprising:
   determining a position of the one of the at-least-one target device based on the at-least-one distance.

4. The system of claim 1 further comprising:
   an initiator device configured for emitting a radio frequency (RF) signal;
   wherein said emitting the low-speed wireless signal comprises:
      emitting the low-speed wireless signal after receiving the RF signal.

5. The system of claim 1, wherein each of the at-least-one target device comprises an inertial-measurement unit (IMU) or accelerometer for determining a position thereof; and
   wherein the at least one engine is configured for:
      using the calculated at-least-one distance for correcting errors of the IMU or the accelerometer or for refining the position.

6. The system of claim 5, wherein said using the calculated at-least-one distance for correcting the errors of the IMU or the accelerometer or for said refining the position comprises:
using the calculated at-least-one distance and a Bayesian method for correcting the errors of the IMU or the accelerometer, or for said refining the position.

7. The system of claim 5, wherein said using the calculated at-least-one distance for correcting the errors of the IMU or the accelerometer or for said refining the position comprises:
using the calculated at-least-one distance and an Error-State Kalman Filter for correcting the errors of the IMU or the accelerometer, or for said refining the position.

8. A method comprising:
calculating each of one or more distances between a target device and a corresponding one of one or more locations based on at least a time-of-arrival of a low-speed wireless signal emitted from said corresponding one of the one or more locations and received by the target device, and a speed of the low-speed wireless signal calculated based on temperature data obtained from a database, said time-of-arrival of the low-speed wireless signal being a time that the low-speed wireless signal is received by the target device.

9. The method of claim 8, wherein the low-speed wireless signal is an acoustic signal.

10. The method of claim 8 further comprising:
determining a position of the target device based on the one or more distances.

11. The method of claim 8, wherein the time-of-arrival of the low-speed wireless signal is measured after a radio frequency (RF) signal is received.

12. The method of claim 8 further comprising:
using the calculated one or more distances for correcting errors of an inertial-measurement unit (IMU) or accelerometer of the target device, or for refining a position determined using the IMU or the accelerometer.

13. The method of claim 12, wherein said using the calculated one or more distances for correcting the errors of the IMU or the accelerometer of the target device or for said refining the position determined using the IMU or the accelerometer comprises:
using the calculated one or more distances and a Bayesian method for correcting the errors of the IMU or the accelerometer of the target device, or for said refining the position determined using the IMU or the accelerometer.

14. The method of claim 12, wherein said using the calculated one or more distances for correcting the errors of the IMU or the accelerometer of the target device or for said refining the position determined using the IMU or the accelerometer comprises:
using the calculated one or more distances and an Error-State Kalman Filter for correcting the errors of the IMU or the accelerometer of the target device, or for said refining the position determined using the IMU or the accelerometer.

15. At least one engine for:
calculating each of one or more distances between a target device and a corresponding one of one or more locations based on at least a time-of-arrival of an acoustic signal emitted from said corresponding one of the one or more locations and received by the target device, and a speed of the acoustic signal calculated based on temperature data obtained from a database, said time-of-arrival of the acoustic signal being a time that the acoustic signal is received by the target device.

16. The at least one engine of claim 15 further configured for:
determining a position of the target device based on the one or more distances.

17. The at least one engine of claim 15, wherein the time-of-arrival of the acoustic signal is measured after a radio frequency (RF) signal is received.

18. The at least one engine of claim 15 further configured for:
using the calculated one or more distances for correcting errors of an inertial-measurement unit (IMU) or accelerometer of the target device, or for refining a position determined using the IMU or the accelerometer.

19. The at least one engine of claim 18, wherein said using the calculated one or more distances for correcting the errors of the IMU or the accelerometer of the target device or for said refining the position determined using the IMU or the accelerometer comprises:
using the calculated one or more distances and a Bayesian method for correcting the errors of the IMU or the accelerometer of the target device, or for said refining the position determined using the IMU or the accelerometer.

20. The at least one engine of claim 18, wherein said using the calculated one or more distances for correcting the errors of the IMU or the accelerometer of the target device or for said refining the position determined using the IMU or the accelerometer comprises:
using the calculated one or more distances and an Error-State Kalman Filter for correcting the errors of the IMU or the accelerometer of the target device, or for said refining the position determined using the IMU or the accelerometer.

* * * * *